US009319480B2

(12) United States Patent
Cortes et al.

(10) Patent No.: US 9,319,480 B2
(45) Date of Patent: Apr. 19, 2016

(54) MANAGING DIGITAL MEDIA PRESENTED IN ONLINE DIGITAL MEDIA STORE

(75) Inventors: Ricardo D. Cortes, Los Gatos, CA (US); David Makower, Milpitas, CA (US); Aloke Bhatnagar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 13/601,980

(22) Filed: Aug. 31, 2012

(65) Prior Publication Data

US 2014/0074964 A1    Mar. 13, 2014

(51) Int. Cl.
*H04L 29/08* (2006.01)
*G06Q 30/02* (2012.01)

(52) U.S. Cl.
CPC ............... *H04L 67/32* (2013.01); *G06Q 30/02* (2013.01)

(58) Field of Classification Search
CPC ... G06Q 30/02; G06Q 30/06; G06Q 30/0601; G06Q 20/123; G06Q 30/0633; G06Q 30/0641; G06Q 50/01; G06F 17/30056; G06F 17/30772; H04N 21/47202; Y10S 707/913
USPC ......... 709/200, 201, 202, 203, 217, 223, 227; 715/234
See application file for complete search history.

(56) References Cited

U.S. PATENT DOCUMENTS

| | | | |
|---|---|---|---|
| 7,418,653 B1 * | 8/2008 | Stern et al. ..................... 715/204 |
| 7,493,106 B2 | 2/2009 | Espelien | |
| 7,689,705 B1 * | 3/2010 | Lester et al. .................. 709/231 |
| 7,739,151 B2 * | 6/2010 | Hayashi ................. G06Q 30/06 705/26.8 |
| 7,774,708 B2 * | 8/2010 | Bell ....................... G06Q 30/06 715/738 |
| 7,844,498 B2 * | 11/2010 | Robbin .................. G06Q 30/00 705/26.1 |
| 7,848,954 B2 * | 12/2010 | Posokhow ............. G06Q 30/06 705/26.8 |
| 7,899,714 B2 * | 3/2011 | Robbin .................. G06Q 30/00 705/26.1 |
| 7,962,634 B2 * | 6/2011 | Cortos .............. G06F 17/30038 705/51 |
| 8,001,011 B2 * | 8/2011 | Hayashi ................. G06Q 30/06 705/26.1 |
| 8,015,237 B2 * | 9/2011 | Muller .............. G06F 17/30017 705/51 |
| 8,161,099 B2 | 4/2012 | Stich et al. | |
| 8,244,896 B2 * | 8/2012 | Woodward et al. ........... 709/231 |
| 8,364,694 B2 * | 1/2013 | Volkert ............. G06F 17/30029 707/767 |
| 8,370,419 B2 * | 2/2013 | Muller .............. G06F 17/30017 705/51 |
| 8,402,555 B2 * | 3/2013 | Grecia .................. H04L 9/3234 713/185 |
| 8,489,468 B2 * | 7/2013 | Robbin .................. G06Q 30/00 705/26.1 |
| 8,671,443 B2 * | 3/2014 | Dagdeviren ............ G06F 21/10 726/6 |

(Continued)

*Primary Examiner* — Sargon Nano
(74) *Attorney, Agent, or Firm* — Fish & Richardson P.C.

(57) ABSTRACT

Systems, methods and computer program products are disclosed for managing digital media for an artist or author in an online digital media store using an automated data feed with a unique data structure or a web service having a simple and intuitive user interface. In some implementations, a webpage is provided by the web service that allows a user to request access to manage an artist or author. Upon such request, a rules-based vetting process is employed by the online digital media store for determining the eligibility of the user to manage the digital media of the artist or author.

35 Claims, 13 Drawing Sheets

(56) References Cited

U.S. PATENT DOCUMENTS

| | | | | |
|---|---|---|---|---|
| 8,682,746 | B2* | 3/2014 | Verosub | G06F 17/30038 705/26.61 |
| 8,880,712 | B2* | 11/2014 | Cortes | G06F 17/30038 709/219 |
| 8,909,682 | B2* | 12/2014 | Heller | G06F 17/3002 707/804 |
| 8,984,442 | B2* | 3/2015 | Pirnack | G06Q 30/0222 715/764 |
| 9,092,436 | B2* | 7/2015 | Grant | G06F 17/30056 |
| 2003/0200507 | A1* | 10/2003 | Stern et al. | 715/517 |
| 2005/0004873 | A1 | 1/2005 | Pou et al. | |
| 2006/0015378 | A1* | 1/2006 | Mirrashidi et al. | 705/7 |
| 2006/0248113 | A1* | 11/2006 | Leffert | G06Q 30/06 |
| 2007/0156770 | A1* | 7/2007 | Espelien | G06F 17/30017 |
| 2008/0032739 | A1* | 2/2008 | Hoodbhoy | G06Q 30/02 455/556.2 |
| 2008/0120199 | A1* | 5/2008 | Pirnack | G06Q 30/02 705/26.8 |
| 2009/0144153 | A1* | 6/2009 | Kondrk | G06Q 30/0277 705/14.73 |
| 2009/0307602 | A1* | 12/2009 | Brewer et al. | 715/744 |
| 2010/0023578 | A1* | 1/2010 | Brant | G06F 17/30749 709/203 |
| 2010/0114739 | A1 | 5/2010 | Johnston | |
| 2010/0161499 | A1 | 6/2010 | Holcombe et al. | |
| 2011/0025713 | A1* | 2/2011 | McIntyre et al. | 345/636 |
| 2011/0029386 | A1* | 2/2011 | Devries | G06Q 30/02 705/14.64 |
| 2011/0113372 | A1* | 5/2011 | Bennetts et al. | 715/810 |
| 2011/0138280 | A1* | 6/2011 | Nagara et al. | 715/716 |
| 2011/0276396 | A1* | 11/2011 | Rathod | G06F 17/30867 705/14.49 |
| 2011/0288970 | A1* | 11/2011 | Kidron et al. | 705/30 |
| 2011/0314370 | A1* | 12/2011 | Evans et al. | 715/234 |
| 2012/0011540 | A1* | 1/2012 | Pulford | G06Q 30/0251 725/32 |
| 2012/0019564 | A1* | 1/2012 | Almgren et al. | 345/667 |
| 2012/0117534 | A1* | 5/2012 | Hershenson et al. | 717/105 |
| 2013/0018845 | A1* | 1/2013 | Macaskill et al. | 707/634 |
| 2013/0055079 | A1* | 2/2013 | Liao et al. | 715/701 |
| 2013/0086474 | A1* | 4/2013 | Oliver et al. | 715/716 |
| 2013/0151988 | A1* | 6/2013 | Sorin et al. | 715/753 |
| 2014/0075308 | A1* | 3/2014 | Sanders et al. | 715/716 |

\* cited by examiner

802 iTunes Connect　　　　　　　ateng@apple.com ▼

Personal Details

1000

First Name　Annie
Last Name　Teng
Apple ID　ateng
Email Address　ateng@apple.com

Change Password

Cancel　　　　　　　　　　　　　　　Save

FIG. 10

MANAGING DIGITAL MEDIA PRESENTED IN ONLINE DIGITAL MEDIA STORE

TECHNICAL FIELD

This disclosure is related generally to data communication systems for managing digital media presented in an online digital media store.

BACKGROUND

Digital media, such as music, e-books, video and software applications, can be distributed to the public through an online digital media store. One example of an online digital media store is the iTunes® store, operated by Apple Inc., Cupertino Calif. Some online digital media stores, such as the iTunes® store, allow content providers (e.g., music distributors) to provide and manage digital media using a web-based application or an automated data feed.

SUMMARY

Systems, methods and computer program products are disclosed for managing digital media in an online digital media store using an automated data feed with a unique data structure or a web service. The automated data feed has a unique data structure that allows users to manage digital media for a large numbers of artists and to provide digital media to the online digital media store. The automated data feed can be controlled by the content provider using a command line interface or script file. The web service provides a user with a simple and intuitive user interface that allows the user to manage digital media associated with an artist presented on one or more pages in the online digital media store.

The web service also allows new users to be added and assigned one or more roles with various levels of access privileges to digital media or functions associated with an artist or author. A rules-based vetting process is used to determine whether a user is eligible to manage the digital media of an artist or author. The vetting process avoids conflicts between multiple users that claim to have legal rights to manage the digital media of the artist in the online digital media store.

In some implementations, a method of providing digital media to an online digital media store comprises: establishing an automated data feed with a client computer operated by a content provider; receiving a data structure over the automated data feed, the data structure including a first metadata or asset associated with a first digital media item, the first digital media item associated with an artist or author having a presence in the online digital media store; and presenting the first digital media item in the online digital media store.

In some implementations, a method of providing digital media to an online digital media store comprises: establishing a communication channel with a client computer operated by a content provider; receiving input through the communication channel, the input specifying an asset associated with an artist or author having a presence in the online digital media store; receiving the specified asset from the client computer; and presenting, or providing access to, the asset in the online digital media store.

In some implementations, a method of claiming an artist or author having a page presenting digital media in an online digital media store comprises: receiving a request from a user to manage an artist or author; determining if the artist or author is assigned to another user; if the artist or author is assigned to another user, rejecting the request; if the artist or author is not assigned to another user, determining if all content delivered to the online digital media store that is associated with the artist or author was provided by the user; if all the content was provided by the user, accepting the request; if all the content was not provided by the user, determining if one content item was provided by the user to the online digital media store within the past x months; if one content item was provided by the user within the past x months, accepting the request; if one content item was not provided by the user within the past x months, determining if the user provided the last content item to the online digital media store; if the user provided the last content item, accepting the request; and if the user did not provide the last content item, rejecting the request.

Other implementations are directed to systems, computer program products and computer-readable mediums.

Particular implementations disclosed herein provide one or more of the following advantages. Administrators, artist managers and other users are provided with an automated data feed with a unique data structure or web service with a simple and intuitive user interface for managing digital media of an artist or author presented on one or more pages of an online digital media store.

The details of the disclosed implementations are set forth in the accompanying drawings and the description below. Other features, objects, and advantages will be apparent from the description and drawings, and from the claims.

DESCRIPTION OF DRAWINGS

FIG. 10 is an exemplary personal details tab of a page for receiving personal details about the user.

The same reference symbol used in various drawings indicates like elements.

DETAILED DESCRIPTION

Exemplary Ingesting System for Online Store

Figure 1:
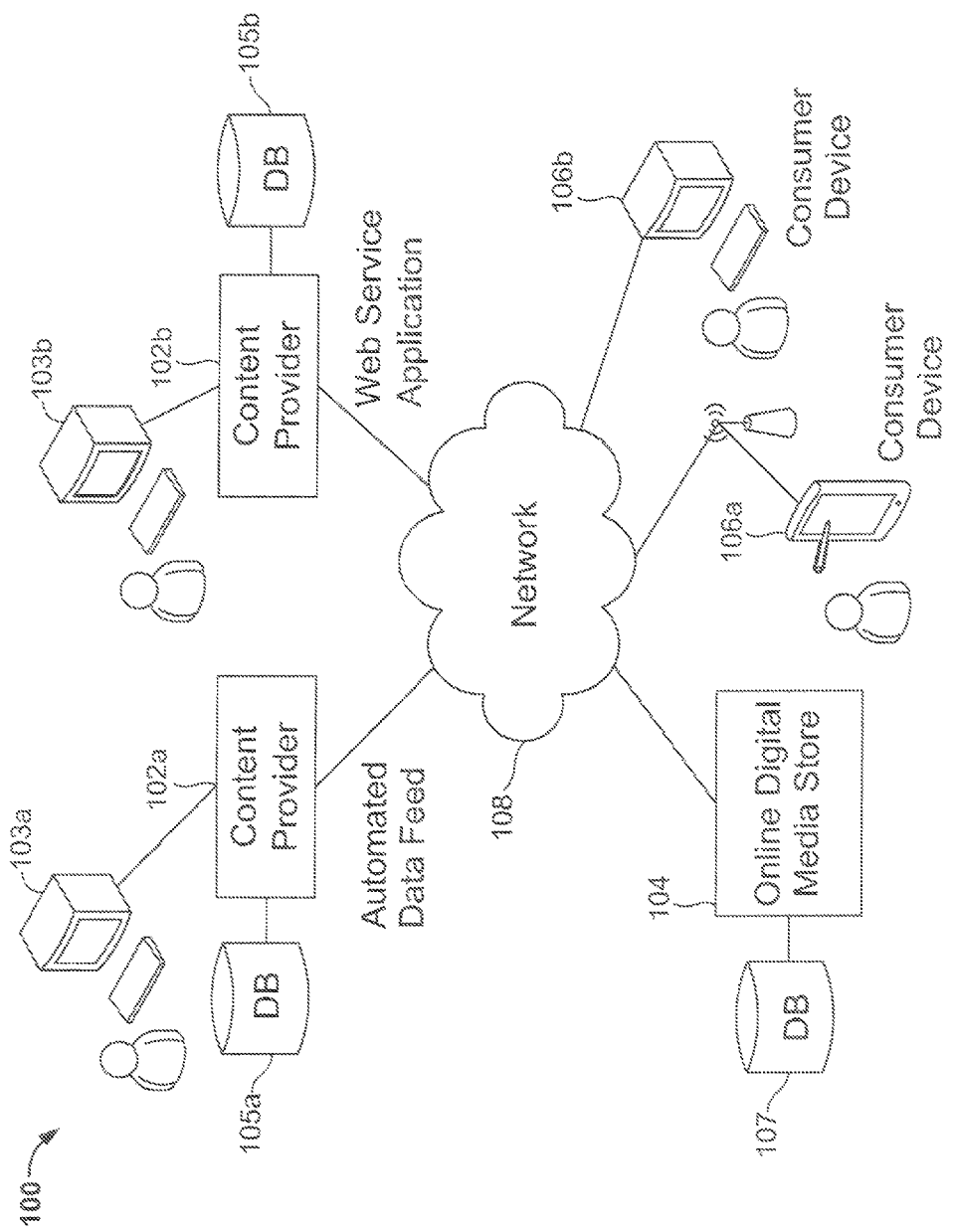
FIG. 1 is a block diagram of an exemplary ingesting system for providing digital media to an online digital media store.

FIG. 1 is a block diagram of an exemplary ingesting system 100 for providing digital media to an online digital media store. In some implementations, system 100 can include content providers 102, online digital media store 104 and consumer devices 106. Each of these entities or devices is coupled to network 108.

Content providers 102a, 102b can include various providers of digital media, such as record companies, artist managers, publishers, and any other individual or entity that is involved in the management of an artist or author (in the case of e-books). Content providers 102 are also referred to herein as "users." Digital media can include any digital content, including but not limited to music, video, artwork, e-books, podcasts, software applications and ring tones.

In the example shown, content provider 102a is coupled to online digital media store 104 through network 108 and an automated data feed. An example of an automated data feed is an Extensible Markup Language (XML) feed.

Content provider 102b is coupled to online digital media store 104 through network 108 through a web service. A web service is an application that is accessed over a network such as the Internet or an intranet using a browser.

Each of the content providers 102a, 102b can include computer systems or other devices (e.g., e-tablets, smart phones) that allow a human user to send digital media to online digital media store 104. For example, content provider 102a can include a computer system that allows a user to create and edit XML documents and send those documents to online digital media store 104 using a command-line interface or script. Content provider 102b can include a computer system with a browser application that allows a user to provide digital media through user interfaces (e.g., webpages) provided by a webpage server operated by or on behalf of the online digital media store 104.

Online digital media store 104 provides consumers access to various digital media items. Consumers can use consumer devices 106a, 106b (e.g., computers, smart phones, e-tablets) to stream or download digital media from online digital media store 104. Consumers can browse various webpages in store 104 or sections of the store 104 that are dedicated to artists or authors (e.g., an artist page or an author page). An artist page can include a variety of digital media, including artwork (e.g., album cover art), a biography of the artist, video clips and artist images. A playlist page can include elements for previewing songs of an album. An album or playlist page can display cover art for the artist's albums and allow a user to preview, purchase and download songs using their various consumer devices 106a, 106b.

A conventional artist page may use a stock image of an artist that is associated with all of the digital media of the artist. In many cases, however, this approach may be undesirable. For example, on an album webpage it may be more desirable to display a different artist image or gallery of images next to each album cover art. For example, an artist manager may find it desirable for marketing an album to place an image of the artist next to the album cover art that depicts the artist at his or her age when the album was first released. It may also be desirable to have a gallery of images of the artist in concert during a tour of the album.

System 100 provides an advantage over conventional data communication systems and methods by using an automated data feed with a unique data structure and a web service with a simple and intuitive user interface. These systems and methods allow administrators, artist managers and other users to add or replace or digital media (e.g., metadata, assets) of an artist or author on one or more webpages (e.g., artist page, album or playlist page) in an online digital media store.

Exemplary Web Service

Figure 2:
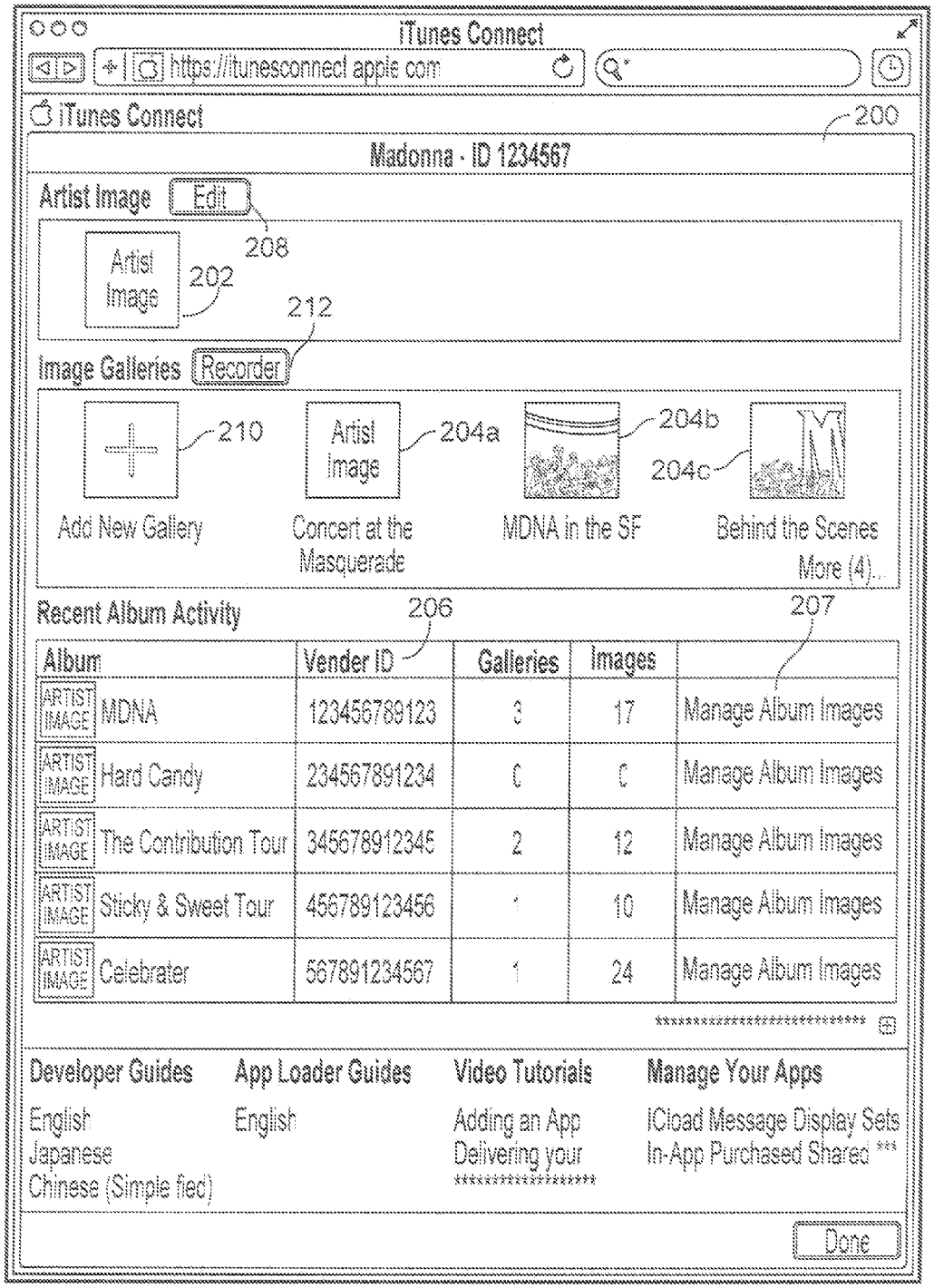
FIG. 2 is an exemplary artist page provided by a web service for managing digital media presented on pages of the online digital media store.

FIG. 2 is an exemplary artist page 200 provided by a web service for managing digital media presented on one or more pages of online digital media store 104. In some implementations, artist page 200 can include artist image 202, gallery images 204a-204c and album table 206. Artist page 200 can be associated with any type of artist or author of digital media. In the example shown, artist page 200 is associated with a recording artist (e.g. a "pop star"). At the top of artist page 200 is the name of the artist and a numerical identifier for the artist, which can be used by online digital media store 104 to identify an artist.

Album table 206 lists albums of the artist. Each row in album table 206 is associated with a single album and can include a thumbnail image of the album cover art, a vendor identification number, the number of galleries associated with the album and a the number of images associated with the album. Link 207 opens a page for managing album images.

In some implementations, artist page 200 can be used by an administrator, artist manager or other user to manage artist image 202 and gallery images 204a-204c. For example, artist image 202 can be edited by selecting user interface element 208. Selecting element 208 opens artist image lightbox 300, which allows a user to edit the images displayed on an artist page, and is further described in reference to FIG. 3.

Figure 3:
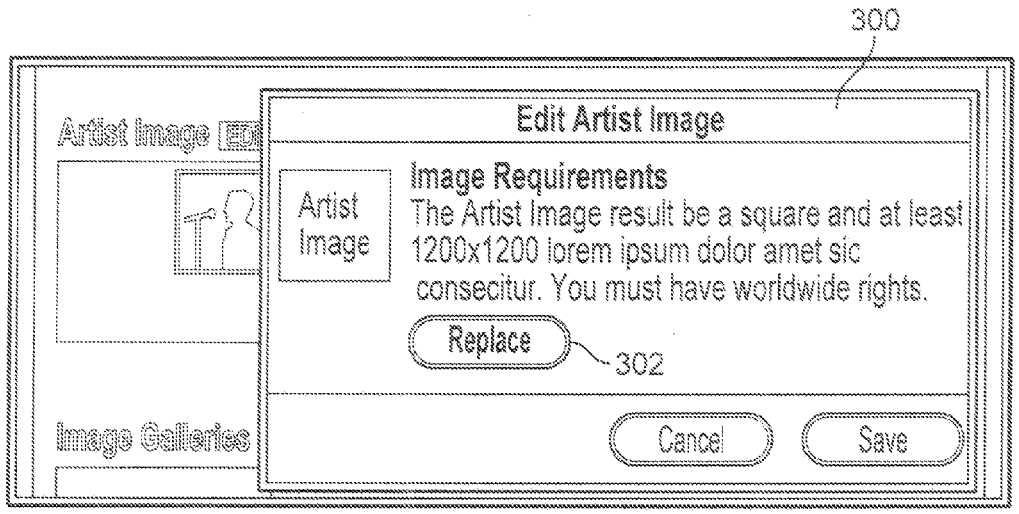
FIG. 3 is an exemplary artist image lightbox for editing an artist image on the artist page.

FIG. 3 is an exemplary artist image lightbox 300 for editing an artist image on artist page 200. Selecting user interface element 302 of artist image lightbox 300 opens a browser window that allows the user to choose an artist image file (e.g., JPEG image) using their computer (103a, 103b). The file can be stored in local database (105a, 105b). When the user selects a "cancel" element, artist image lightbox 300 closes and changes are not saved. When the user selects a "save" element, artist image lightbox 300 closes and changes are saved causing the artist page 200 to be updated.

In the example shown, the user previously selected artist image 200 and therefore user interface element 208 is used to replace artist image 200. If the user did not previously select an artist image, a silhouette gray image or other visual indicator is displayed, and user interface element 208 is used to choose an artist image file from the user's local database (105a, 105b).

Figure 4:
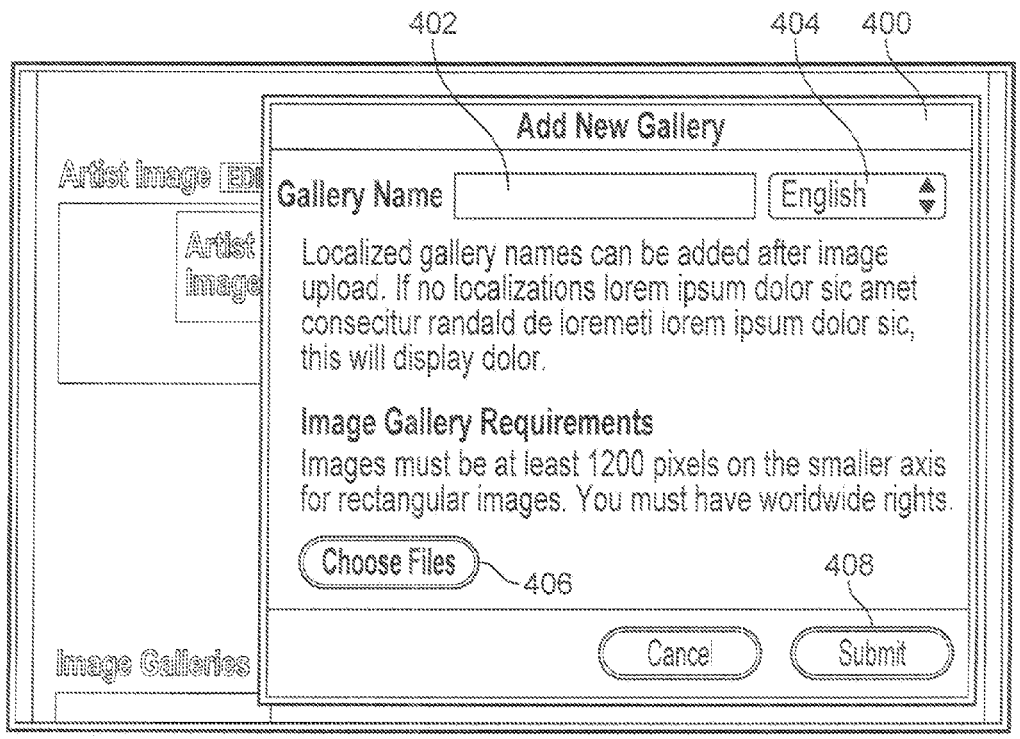
FIG. 4 is an exemplary new gallery lightbox for adding a new image gallery to the artist page.

FIG. 4 is an exemplary new gallery lightbox 400 for adding a new image gallery to the artist page 200. Referring to FIG. 1 and FIG. 4, selecting icon 210 opens new gallery lightbox 400 for adding individual images to a gallery or adding a new gallery of images. New gallery lightbox 400 can include text input field 402 for adding a name for the new gallery, menu 404 for selecting a language for image captions and user interface element 406 for choosing image files through a browser window from the user's local database (105a, 105b). User interface element 408 can be used to submit the selected images to online digital media store 104.

Figure 5:
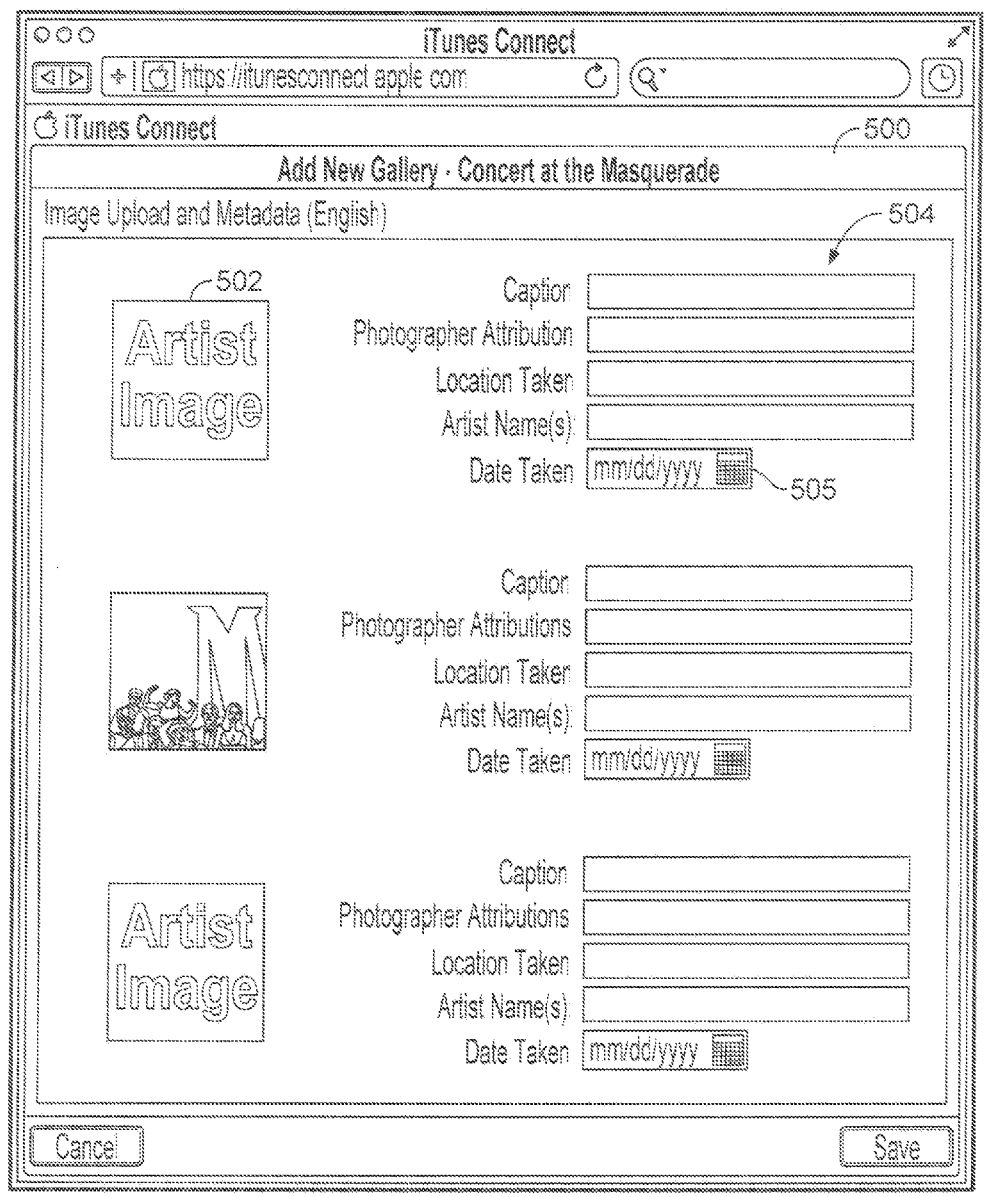
FIG. 5 is an exemplary upload gallery images page for adding images and metadata to a gallery.

FIG. 5 is an exemplary upload gallery images page 500 for adding images and metadata to the gallery. After submitting the selected images using element 408, upload gallery images page 500 is displayed.

In some implementations, upload gallery images page 500 includes image thumbnail 502 of each uploaded gallery image and corresponding text input fields 504 for adding metadata (e.g., image details) for the uploaded image. Text input fields 504 can include a caption field, a photographer attribution field, a location taken field, an artist name(s) field and a date taken field. Other text input fields are also possible. Caption field allows the user to specify a caption for the corresponding image 502. Photographer attribution field allows the user to specify the name of the photographer who took the image. Location taken field allows the user to specify the location where the image was taken. Artist name(s) field allows the user to specify the name of the artist or artists in the image. Date taken field allows the user to specify the date the image was taken. Selecting calendar icon 505 in the date taken field displays a mini calendar (not shown) to facilitate the selection of a date by the user.

Figure 6:
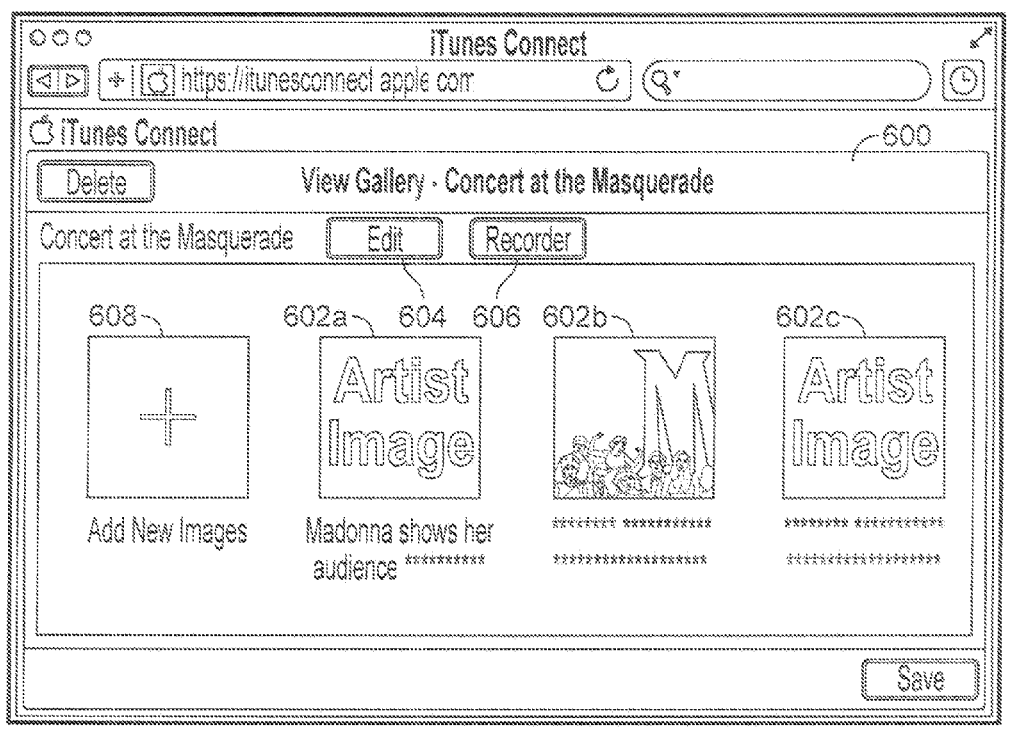
FIG. 6 is an exemplary view gallery page for viewing a gallery of images.

FIG. 6 is an exemplary view gallery page 600 for viewing a gallery of images. View gallery page 600 can be opened by a user selecting one of the galleries 204a-204c shown on artist page 200 or by clicking "save" element on page 500. In this example, gallery 204a was selected by the user clicking on gallery 204a. Galleries can also be selected by hovering a mouse cursor over the gallery or by touching the gallery with a finger or stylus if the user's computer (103a, 103b) has a touch sensitive display.

In some implementations, view gallery page 600 includes one or more gallery images 602a-602c, image edit element 604, reorder element 606 and add new image icon 608. Element 604 opens an edit gallery image page that allows a user to change image details and add a new language for the gallery name. Element 608 allows the user to add more images to the gallery. Element 606 opens a reorder images page as described in reference to FIG. 7. Clicking on a gallery image opens an image details lightbox (not shown), which displays the image and its metadata (e.g., caption, photo attribution, location taken). A user can then delete the image or edit the metadata.

Figure 7:
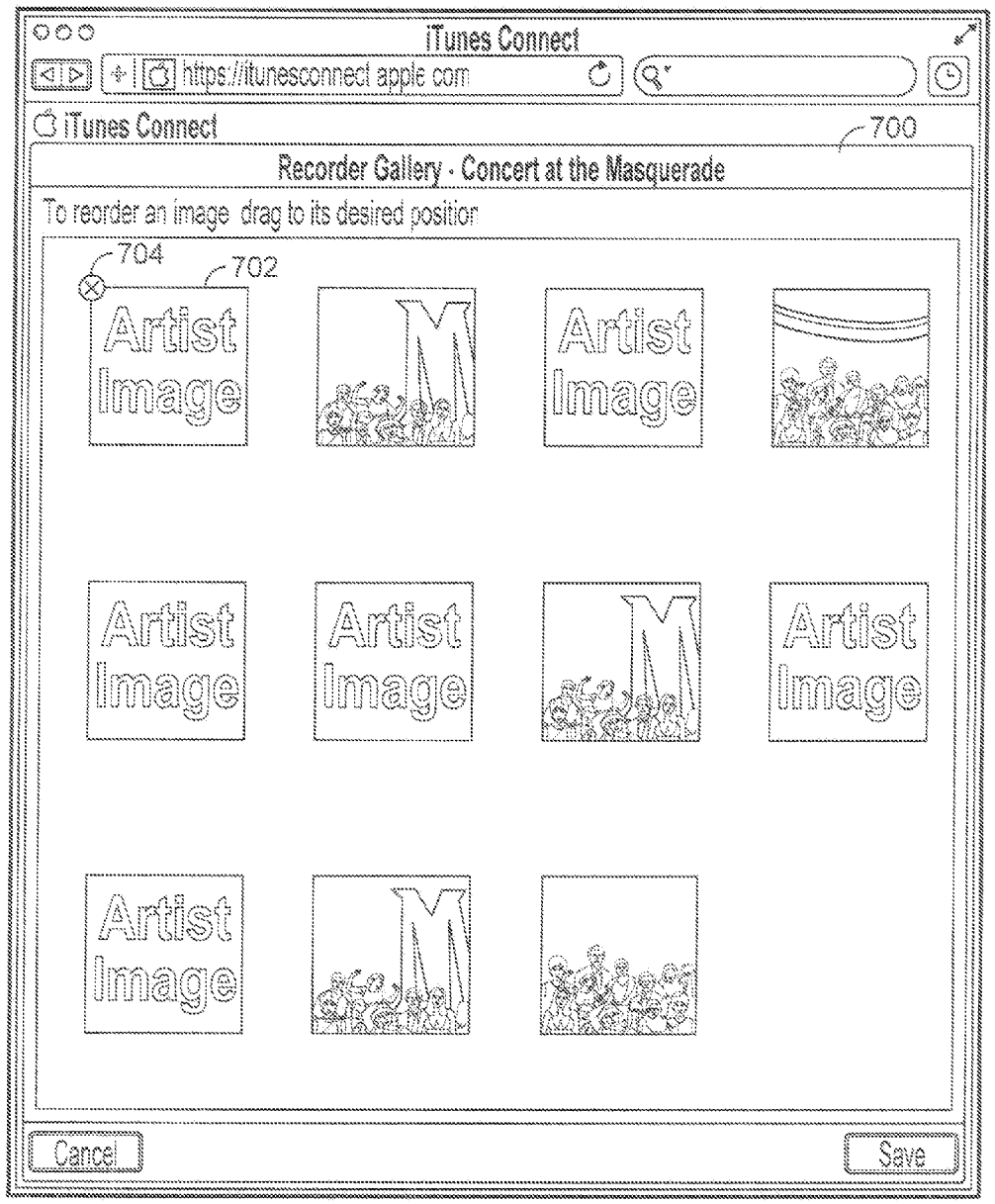
FIG. 7 is an exemplary user interface element for reordering a gallery of images.

FIG. 7 is an exemplary reorder images page 700 for reordering images in a gallery. Reorder images page 700 allows a user to drag thumbnail 702 of an image to a desired location on page 700. Clicking and dragging thumbnail image 702 grays the selected image and rearranges its position on page 700. When hovering over thumbnail image 702, delete icon 704 is shown. Clicking delete icon 704 removes the selected image 702 from the gallery. A "cancel" element cancels changes and opens view gallery page 600. A "save" element saves the changes and opens view gallery page 600.

Figure 8:
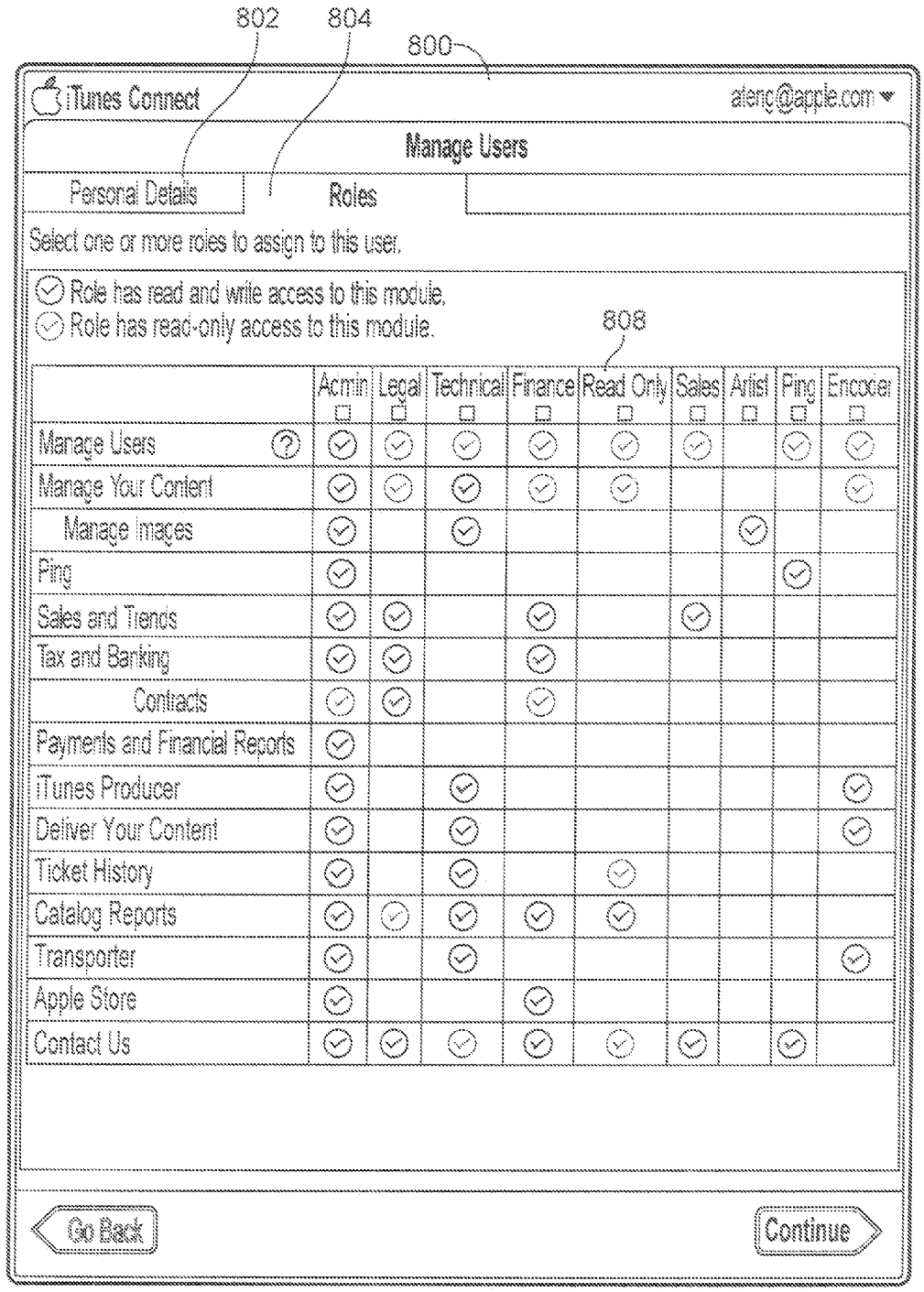
FIG. 8 is an exemplary page for adding new users to an artist account.
Figure 9:
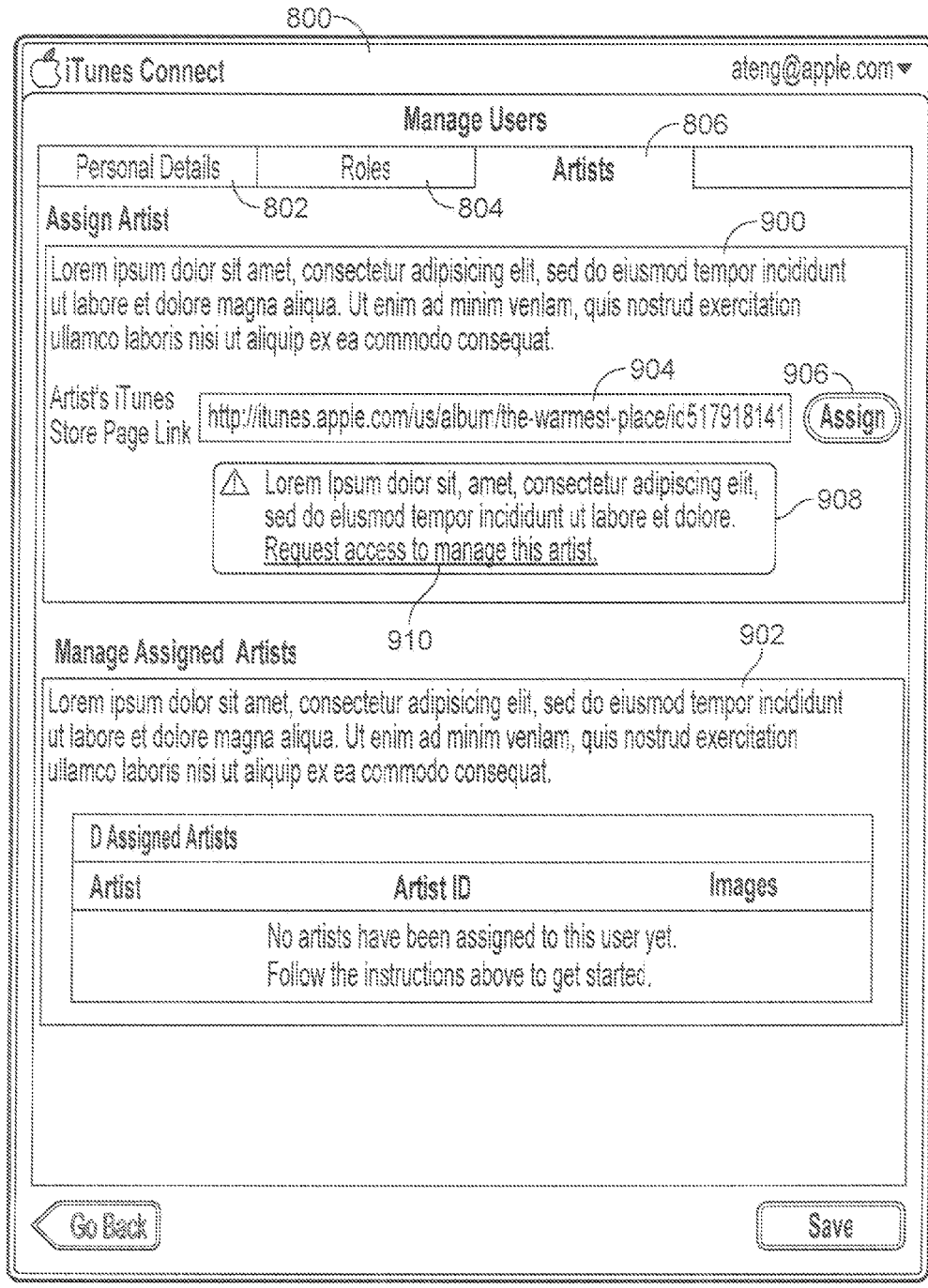
FIG. 9 is an exemplary artists tab of a page for assigning artists to users.

FIG. 8 is an exemplary add new user page 800 for adding new users to an artist account. Add new user page 800 includes personal details tab 802, roles tab 804 and artists tab 806 (FIG. 9). In FIG. 8, roles tab 804 has been selected.

Roles tab 804 includes table 808 for assigning one or more roles to a user. Each role has an associated read and write, or read-only access privilege for digital media and other functions (e.g., reports). The rows of table 808 correspond to the various digital media or functions arranged in categories. Some example categories are "sales and trends" or "payments and financial reports." Other categories are also possible. The columns of table 808 correspond to the roles that can be assigned to a user. Some examples of roles are: administrator, legal, technical, financial, read only, sales, artist and encoder. Other roles are also possible. A colored checkmark in a cell of table 808 indicates read and write access (e.g., a green checkmark) or read-only access (e.g., a gray checkmark) for the role. A user is assigned one or more roles by clicking the appropriate checkbox(s) at the top of each column of table 808 and then clicking the "continue" element.

FIG. 9 is an exemplary artists tab 806 of add new user page 800 for assigning artists to users. Tab 806 includes assign artist section 900 and assigned artists table 902. Assign artist section 900 includes input text field 904 for allowing the user to specify a link to an artist page in online digital media store 104. Clicking assign element 906 initiates a request to online digital media store 104 to assign the artist to the user. If the artist is successfully assigned to the user, the artist name, identifier and images will be listed in assigned artists table 902. After an artist is assigned and appears in table 902 a search box and remove assignment element (not shown) is added to table 902 to facilitate the searching and deleting of artist assignments.

In the example shown, the assignment was rejected and error message 908 was displayed rejecting the user's request to be assigned an artist. Error message 908 can be presented for several reasons. Some example reasons include but are not limited to: 1) the user is not eligible since no content has been provided by the user for this artist; 2) the artist was assigned to another user (e.g., assigned to another content provider), and the user has provided content (dispute link 910 is presented); 3) the artist is being managed by the user, and is already assigned to the user (a link to page 900 is presented); and 4) an inaccurate link (URL) to online digital media store 104 was input into text input field 904 (a link to a help manager is provided).

In the example shown, the artist was assigned to another content provider, and the user has provided digital media to online digital media store 104. The user can dispute the rejection by clicking dispute link 910 in error message 908. Upon clicking dispute link 910, dispute lightbox 1100 is opened, as described in reference to FIG. 11.

FIG. 10 is an exemplary personal details tab 802 of add new user page 800 for receiving personal details about the user. Personal details tab 802 includes text input fields 1000 for allowing a user to enter personal information, including, for example, first name, last name, account ID and an e-mail address. Personal details tab 802 also allows a user to change their account password.

Figure 11:
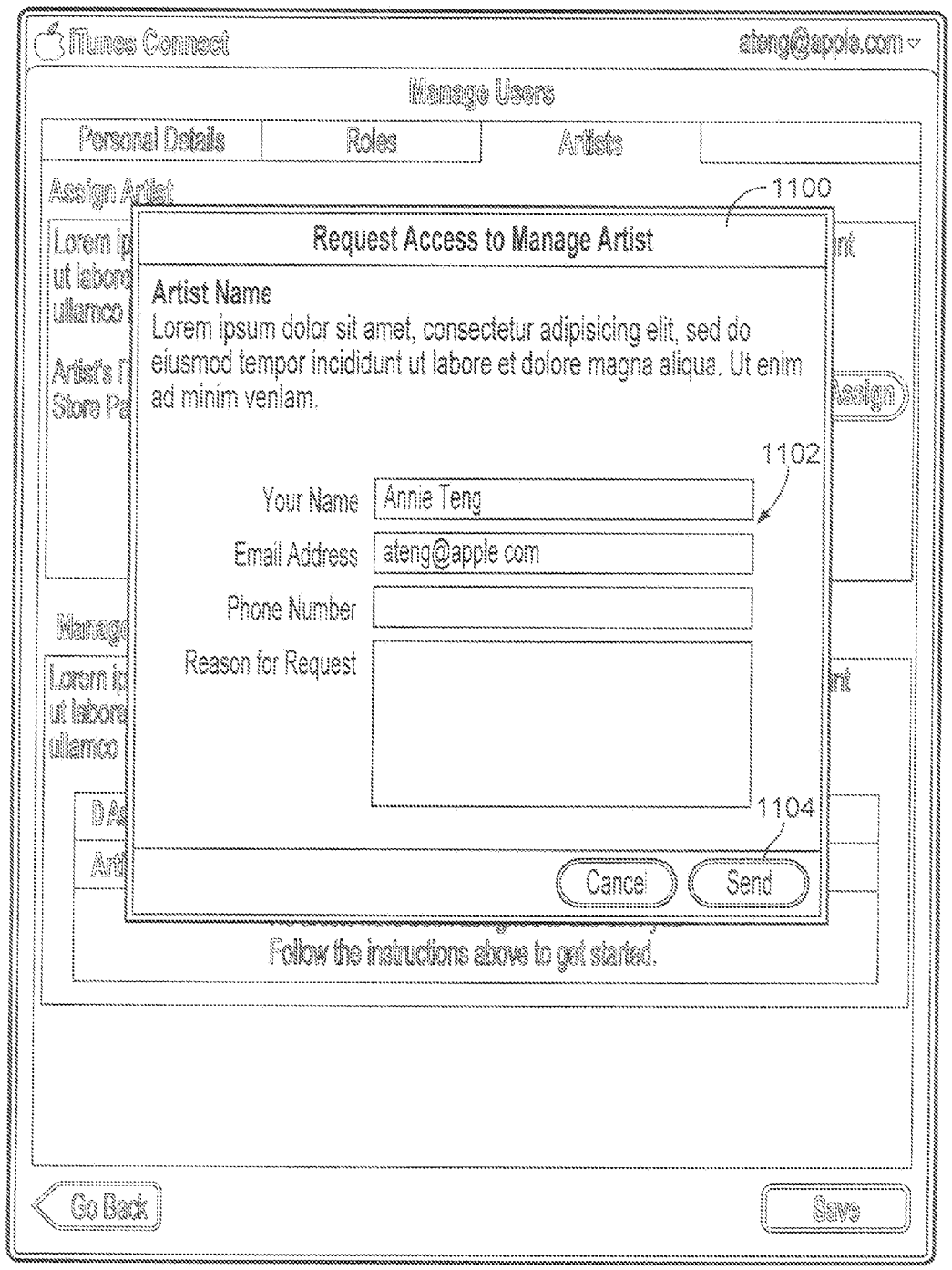
FIG. 11 is an exemplary user interface element for allowing users to request access to manage the digital media of an artist or author.

FIG. 11 is an exemplary dispute lightbox 1100 for allowing users to request access to manage an artist when another provider has been assigned to the artist and the user has provided digital media in the past. Upon selection of link 910 of add new user page 800 (FIG. 8), access dispute lightbox 1100 is opened. Dispute lightbox 1100 includes text input fields 1102 for providing the user's name, e-mail address, phone number and reason for the request. "Send" element 1104 can be clicked by the user to send the request to online digital media store 104. Upon receipt of the message, online digital media store 104 initiates a rules-based vetting process to determine if the user is eligible to manage the digital media of an artist. If the request is accepted, the user will be allowed to assign the artist in assign artist section 900 (using element 906) and the artist will be added to artist table 902.

Exemplary Artist Claiming Process

Figure 12:
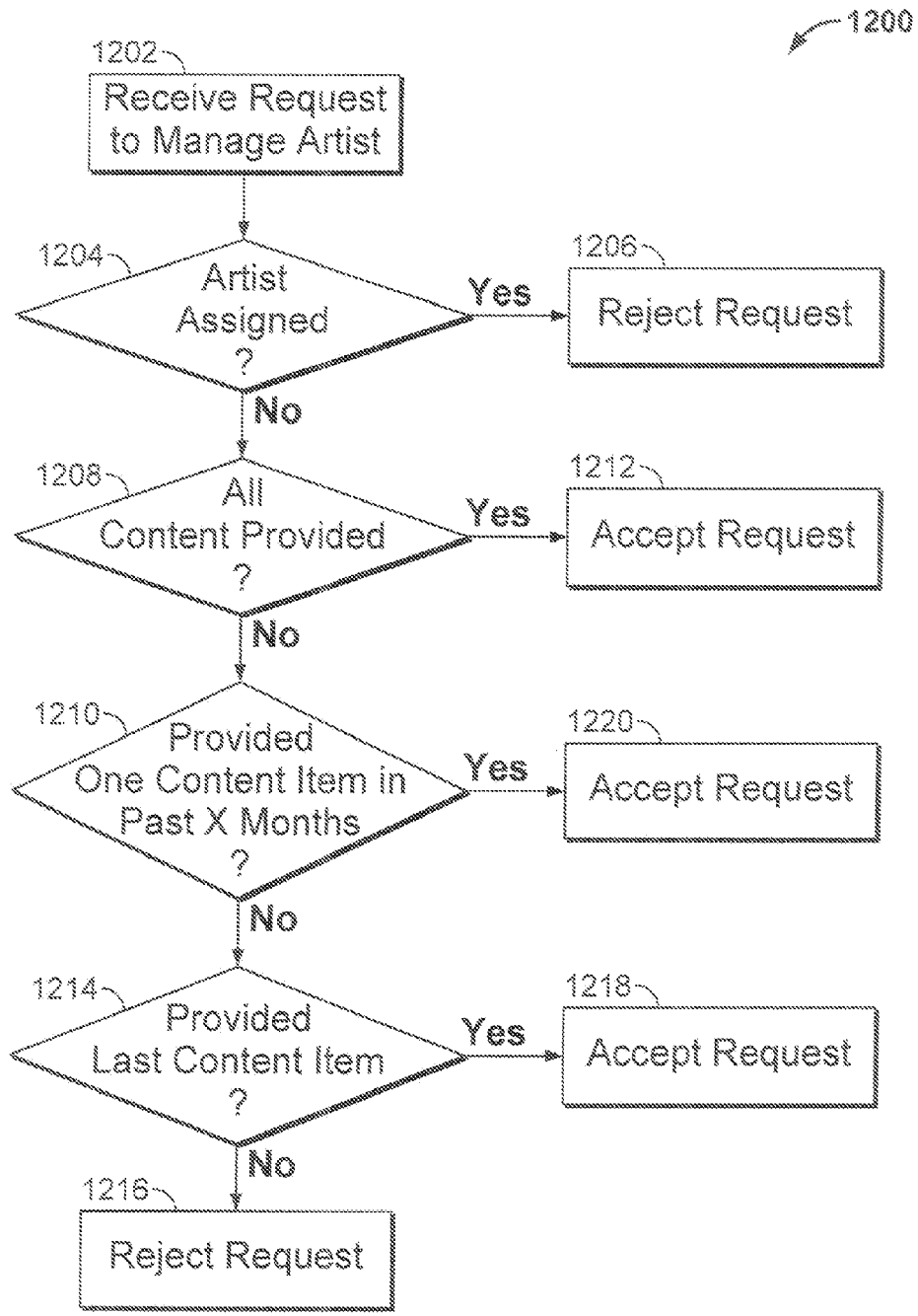
FIG. 12 is a flow diagram of an exemplary artist claiming process.

FIG. 12 is a flow diagram of exemplary artist claiming process 1200. Process 1200 can be implemented by system 100 shown in FIG. 1 using one or more server computers as described in reference to FIG. 15.

Process 1200 can begin by receiving a request for access to manage an artist (1202). Step 1202 can occur when assign element 906 is clicked by the user. Process 1200 can continue by determining if another user has been assigned to the artist (1204). If another user has been assigned to the artist, the request is rejected (1206) and error message 908 is displayed.

If another user has not been assigned to the artist, process 1200 can continue by determining if the user provided all the content (e.g., all albums provided by the user) for the artist (1208) to the online digital media store. If the user (e.g., a single artist manager) has provided all the content for the artist to the online digital media store, the request is accepted (1212) and the artist is added to table 902.

If the user did not provide all the content for the artist, process 1200 can continue by determining if the user provided at least one content item (e.g., one album) under the artist's name within the last x months (e.g., 12 months) (1210). If the user provided at least one content item under the artist's name within the last x months, then the request is accepted (1220) and the artist is added to table 902.

If the user did not provide at least one content item within the last x months, then process 1200 can continue by determining if the user provided the last content item to the online digital media store (1214). If the user provided the last content item to the online digital media store, then the request is accepted (1218) and the artist is added to table 902. Otherwise, the request is rejected (1218) and error message 908 is displayed.

Exemplary Automated Data Feed Process

FIGS. 1-11 describe a web service that allows content providers 102 to upload and manage digital media associated with an artist presented in online digital media store 104. In some implementations, an automated data feed can be used to upload and manage digital media. The automated data feed can use any desired data structure. In the example implementations described in this section, XML data structures are used to implement an automated data feed between content providers 102 and online digital media store 104.

XML is a markup language that defines a set of rules for encoding documents in a format that is both human-readable and machine-readable. It is defined in the XML 1.0 Specification produced by the W3C standards organization, and several other related specifications based on open standards. As described below, XML can be used for the representation of data structures in web services. An XML feed sends data formatted with XML tags to online digital media store 104. Server computers operated by or on behalf of online digital media store 104 run automated programs (e.g., an XML parser) to validate the format of the data structure and then to parse out data (e.g., files, metadata) from the validated XML data structure. The parsed out data can be indexed and stored in one or more databases (105a, 105b). Databases 105a, 105b can be used by other automated programs to populate webpages of online digital media store 104 with the data received from the XML feed.

The XML data structure shown below includes tags that are relevant to supporting artist images under an <artist> tag. In the example shown, the artist is recording artist "Madonna®" and the online digital media store is iTunes® store. Madonna's artist manager or administrator desires to add an artist image and gallery images of Madonna on her artist and album pages in iTunes® store. The example XML data structure can be populated with metadata and asset files by Madonna's manager, administrator or other authorized user.

```
<?xml version="1.0" encoding="UTF-8"?>
<package xmlns="http://apple.com/itunes/importer" version="music5.0">
```

-continued

```
<language>en</language>
<provider>Universal</provider>
<artist>
<apple_id>20044</apple_id>
<artist_name>Madonna</artist_name>
<!-- Add optional translations -->
<locales>
<locale name="ja">
<artist_name>マドンナ</artist_name>
<!-- Optional phonetic_name, allowed for select languages (Japanese) -->
<phonetic_name>まどんな</phonetic_name>
</locale>
</locales>
<hero_image>
<vendor_id>MADONNA_HERO_IMAGE</vendor_id>
<hero_image_file>
<file_name>MADONNA_HERO_IMAGE.png</file_name>
<checksum type="md5">736a64333baa8266c26aa87d882da05a</checksum>
<size>384675</size>
</hero_image_file>
</hero_image>
<galleries>
<gallery>
<vendor_id>CONCERT_AT_THE_MASQUERADE</vendor_id>
<display_name>Concert at the Masquerade</display_name>
<locales>
<locale name="de">
<display_name>Konzert in der Maskerade</display_name>
</locale>
<locale name="pt">
<display_name>Concerto no baile de máscaras</display_name>
</locale>
<locale name="ja">
<display_name>マスカレードでのコンサート</display_name>
</locale>
</locales>
<gallery_items>
<gallery_item type="image">
<assets>
<asset>
<data_file>
<file_name>stage_setup.jpg</file_name>
<size>604158</size>
<checksum type="md5">77f753fcbb39115296934ad288a8fa31</checksum>
</data_file>
</asset>
</assets>
<event_date>2012-05-22</event_date>
<caption>The stage is being set for the concert.</caption>
<location>San Francisco, California</location>
<attribution>© 2012 The Photographer</attribution>
<locales>
<locale name="de">
<caption>Die Bühne wird fü das Konzert gesetzt.</caption>
<location>Vereinigte Staaten</location>
<attribution>© 2012 Der Fotograf</attribution>
</locale>
<locale name="pt">
<caption>A música está prestes a começar no concerto.</caption>
<location>Estados Unidos</location>
<attribution>O Fotógrafo © 2012</attribution>
</locale>
<locale name="ja">
<caption>ステージはコンサートのために設定されています</caption>
<location>米国</location>
<attribution>撮影者 © 2012</attribution>
</locale>
</locales>
</gallery_item>
<gallery_item type="image">
<assets>
<asset>
<data_file>
<file_name>madonna_in_top_hat.jpg</file_name>
<size>894154</size>
<checksum type="md5">f75377f9693fa31288a8cbb3911524ad</checksum>
</data_file>
```

```
</asset>
</assets>
<event_date>2012-05-22</event_date>
<caption>The concert ends with a spectacular light show.</caption>
<location>San Francisco, California</location>
<attribution>© 2012 The Photographer</attribution>
<locales>
<locale name="de">
<caption>Das Konzert endet mit einer spektakulären Lichtshow.</caption>
<location>Vereinigte Staaten</location>
<attribution>© 2012 Der Fotograf</attribution>
</locale>
<locale name="pt">
<caption>O concerto termina com um espetacular show de luzes.</caption>
<location>Estados Unidos</location>
<attribution>O Fotógrafo © 2012</attribution>
</locale>
<locale name="ja">
<caption>コンサートでは,壮大な光のショーで終わる</caption>
```
```
<location>米国</location>
<attribution>撮影者 © 2012</attribution>
</locale>
</locales>
</gallery_item>
</gallery_items>
</gallery>
</galleries>
</artist>
</package>
```

The following paragraphs provide annotations for the metadata in the example XML data structure. These annotations can be used by content providers to correctly populate the XML data structure so that it passes validation by automated validation programs running on the iTunes® store server computers.

```
<artist>
```
Artist (required)
Begins the <artist> block.
```
<apple_id>20044</apple_id>
```
Artist Apple ID (required)
Each artist must have an Apple ID. Currently, hero images and galleries can only be delivered for existing artists. If you do not know the artist's Apple ID, you can do a metadata lookup on an album by the artist and
look for the comment: <!--Apple ID: -->.
```
<artist_name>Madonna</artist_name>
```
Artist Name (required)
Name of the artist. Note that artist roles or primary status are not specified in this context (when <artist> appears directly under <package>).
```
<hero_image>
```
Artist Hero Image (optional; can be updated)
Begins the <hero_image> block. Note that only one hero image can be delivered for an artist. If you want the hero image to appear also in a gallery, you must deliver the image again as a <gallery_item> within a gallery.
```
<vendor_id>MADONNA_HERO_IMAGE</vendor_id>
```
Hero Image Vendor ID (required)
The vendor ID of the hero image, which uniquely identifies the image for reporting. The vendor identifier can only contain alphanumeric characters and underscore marks; it cannot contain spaces, dashes, ampersands, other punctuation, or symbols. The vendor identifier is case-sensitive and must not start with an underscore. Although a vendor ID may contain digits, it is treated as a string, not numbers.
```
<hero_image_file>
<file_name>MADONNA_HERO_IMAGE.png</file_name>
<checksum type="md5">736a64333baa8266c26aa87d882da05a</checksum>
<size>384675</size>
</hero_image_file>
```
Hero Image Asset File (required; can be updated)
The hero image file is required, and you must provide the <file_name>, <size>,and <checksum>. The artwork file must be square and be a minimum of 1200 by 1200 pixels.
```
<galleries>
```
Image Galleries (optional)
Begins the <galleries> block. Even if you are delivering only one gallery, it must be enclosed within a <galleries> block. Galleries will appear on the online store in the order they are delivered in the metadata. If you have already delivered the metadata and are adding new galleries, the new galleries will appear before the older galleries.
```
<gallery>
```
Gallery (required if delivering a gallery; can be updated)
Begins the <gallery> block where you supply metadata for the gallery. There is no limit to the number of galleries you can deliver. To remove a gallery, use <gallery remove="true"> and supply the <vendor_id>.
vendor_id>CONCERT_AT_THE_MASQUERADE</vendor_id>
Gallery Vendor ID (required)
The vendor ID of the gallery, which uniquely identifies the gallery. The vendor identifier can only contain alphanumeric characters and underscore marks; it cannot contain spaces, dashes, ampersands, other punctuation, or symbols. The vendor identifier is case-sensitive and must not start with an underscore. Although a vendor ID may contain digits, it is treated as a string, not numbers.
```
<display_name>Concert at the Masquerade</display_name>
```
Gallery Display Name (required; can be updated)
Name of the gallery as displayed on the Store using up to 50 characters.
```
<locales>
<locale name="de">
```

```
<display_name>Konzert in der Maskerade</display_name>
</locale>
<locale name="pt">
<display_name>Concerto no baile de máscaras</display_name>
</locale>
<locale name="ja">
<display_name>マスカレードでのコンサート</display_name>
</locale>
</locales>
```
Locales (optional; can be updated)
Provides a mechanism to specify localizations for the gallery display name using up to 50 characters. In this example, German, Portuguese, and Japanese localizations are being delivered.
```
<gallery_items>
```
Gallery Items (optional; can be updated)
Begins the <gallery_items> block where you supply metadata for the gallery images. A gallery must have at least one <gallery_item>. If you are sending an update to change the order of the galleries, you can omit the <gallery_items>block. However, if you are updating a gallery item (such as changing a caption or adding an attribution), you must redeliver all gallery items in the gallery. If you include the <gallery_items> block and leave out a <gallery_item>, the <gallery_item> will be deleted.
```
<gallery_item type="image">
```
Gallery Item (optional; can be updated)
Defines each <gallery_item>, including the image caption event date, location, and copyright attribution, along with the image asset. The type attribute is required; currently only "image" is supported. Make sure you only send images you can legally share worldwide. Note: The gallery images appear in the gallery in the order they are delivered in the metadata. The first image will be the primary (or default) image for the gallery and there is no limit to the number of images in a gallery.
```
<assets>
<asset>
<data_file>
<file_name>stage_setup.jpg</file_name>
<size>604158</size>
<checksum type="md5">77f753fcbb39115296934ad288a8fa31</checksum>
</data_file>
</asset>
</assets>
```
Gallery Item Asset File (required)
The gallery item image file is required, and you must provide the <file_name>, <size>,and <checksum>. The artwork file can be a square or rectangle with a minimum of 1200 on the shortest side.
```
<event_date>2012-05-22</event_date>
```
Event Date (optional; can be updated)
Provides the date of the event pictured in the image. The date format must be in YYYY-MM-DD.
```
<caption>The stage is being set for the concert.</caption>
```
Gallery Item Caption (optional; can be updated)
Provides a caption for the image using up to 50 characters.
```
<location>San Francisco, California</location>
```
Gallery Item Location (optional; can be updated)
Provides the location for the image using up to 50 characters.
```
<attribution>© 2012 The Photographer</attribution>
```
Gallery Item Attribution (optional; can be updated)
Provides the copyright information and gives credit to the photographer. Can use up to 50 characters.
```
<locales>
<locale name="de">
<caption>Die Bühne wird fü das Konzert gesetzt.</caption>
<location>Vereinigte Staaten</location>
<attribution>© 2012 Der Fotograf</attribution>
</locale>
<locale name="pt">
<caption>A música está prestes a começar no concerto.</caption>
<location>Estados Unidos</location>
<attribution>O Fotógrafo © 2012</attribution>
</locale>
<locale name="ja">
<caption>ステージはコンサートのために設定されています</caption>
<location>米国</location>
<attribution>撮影者 © 2012</attribution>
</locale>
</locales>
```
Locales (optional; can be updated)
Provides a mechanism to specify localizations for the gallery item caption, location, and attribution.

The following is an example XML data structure for album artist images metadata.

```
<?xml version="1.0" encoding="UTF-8"?>
<package xmlns="http://apple.com/itunes/importer" version="music5.0">
<language>en</language>
<provider>Universal</provider>
<album>
<vendor_id>00602527969220</vendor_id>
<upc>00602527969220</upc>
<title>MDNA (Deluxe Version)</title>
...
<galleries>
<gallery>
<vendor_id>CONCERT_AT_THE_MASQUERADE</vendor_id>
<display_name>Concert at the Masquerade</display_name>
<locales>
<locale name="de">
<display_name>Konzert in der Maskerade</display_name>
</locale>
<locale name="pt">
<display_name>Concerto no baile de máscaras</display_name>
</locale>
</locales>
<gallery_items>
<gallery_item type="image">
<assets>
<asset>
<data_file>
<file_name>stage_setup.jpg</file_name>
<size>604158</size>
<checksum type="md5">77f753fcbb39115296934ad288a8fa31</checksum>
</data_file>
</asset>
</assets>
<event_date>2012-05-22</event_date>
<caption>The stage is being set for the concert.</caption>
<location>San Francisco, California</location>
<attribution>© 2012 The Photographer</attribution>
<locales>
<locale name="de">
<caption>Die Bühne wird fü das Konzert gesetzt.</caption>
<location>Vereinigte Staaten</location>
<attribution>© 2012 Der Fotograf</attribution>
</locale>
<locale name="pt">
<caption>A música está prestes a começar no concerto.</caption>
<location>Estados Unidos</location>
<attribution>O Fotógrafo © 2012</attribution>
</locale>
</locales>
</gallery_item>
<gallery_item type="image">
<assets>
<asset>
<data_file>
<file_name>madonna_in_top_hat.jpg</file_name>
<size>894154</size>
<checksum type="md5">f75377f9693fa31288a8cbb3911524ad</checksum>
</data_file>
</asset>
</assets>
<event_date>2012-05-22</event_date>
<caption>The concert ends with a spectacular light show.</caption>
<location>San Francisco, California</location>
<attribution>© 2012 The Photographer</attribution>
<locales>
<locale name="de">
<caption>Das Konzert endet mit einer spektakulären Lichtshow.</caption>
<location>Vereinigte Staaten</location>
<attribution>© 2012 Der Fotograf</attribution>
</locale>
<locale name="pt">
<caption>O concerto termina com um espetacular show de luzes.</caption>
<location>Estados Unidos</location>
<attribution>O Fotógrafo © 2012</attribution>
</locale>
</locales>
</gallery_item>
<!--Additional gallery items here-->
</gallery_items>
</gallery>
<!--Additional galleries here-->
</galleries>
<hero_image>
<vendor_id>MADONNA_HERO_IMAGE</vendor_id>
<hero_image_file>
<file_name>MADONNA_HERO_IMAGE.png</file_name>
<checksum type="md5">736a64333baa8266c26aa87d882da05a</checksum>
<size>384675</size>
</hero_image_file>
</hero_image>
...
</album>
</package>
```

A user can add new galleries and change the order of the galleries as they appear on the album or playlist webpage. To change the order of the galleries, an optional attribute force_sequence="true" in the <galleries> tag can be used to indicate that the galleries are to appear in the store in the order listed in the metadata. When using the force_sequence="true" attribute, all galleries are referenced by <vendor_id> and <display_name>. Note that the <gallery_items> block may be omitted when submitting an update with the sole purpose of reordering galleries.

An example XML data structure for reordering galleries of images is set forth below. In the example shown, the galleries are being reordered. None of the gallery items will be changed, so those tags have been omitted from the metadata. The annotations for the tags in this XML were previously described above for artist image metadata and will not be repeated here.

```
<?xml version="1.0" encoding="UTF-8"?>
<package xmlns="http://apple.com/itunes/importer" version="music5.0">
<language>en</language>
<provider>Universal</provider>
<artist>
<apple_id>20044</apple_id>
<artist_name>Madonna</artist_name>
...
<galleries force_sequence="true">
<gallery>
<vendor_id>46729438_GALLERY_02</vendor_id>
<display_name>Gallery 02</display_name>
</gallery>
<gallery>
<vendor_id>CONCERT_AT_THE_MASQUERADE</vendor_id>
<display_name>Concert at the Masquerade</display_name>
</gallery>
<gallery>
<vendor_id>46573938_GALLERY_03</vendor_id>
<display_name>Gallery 03</display_name>
</gallery>
</galleries>
...
</artist>
</package>
```

Exemplary Ingesting Process Using Automated Data Feed

Figure 13:
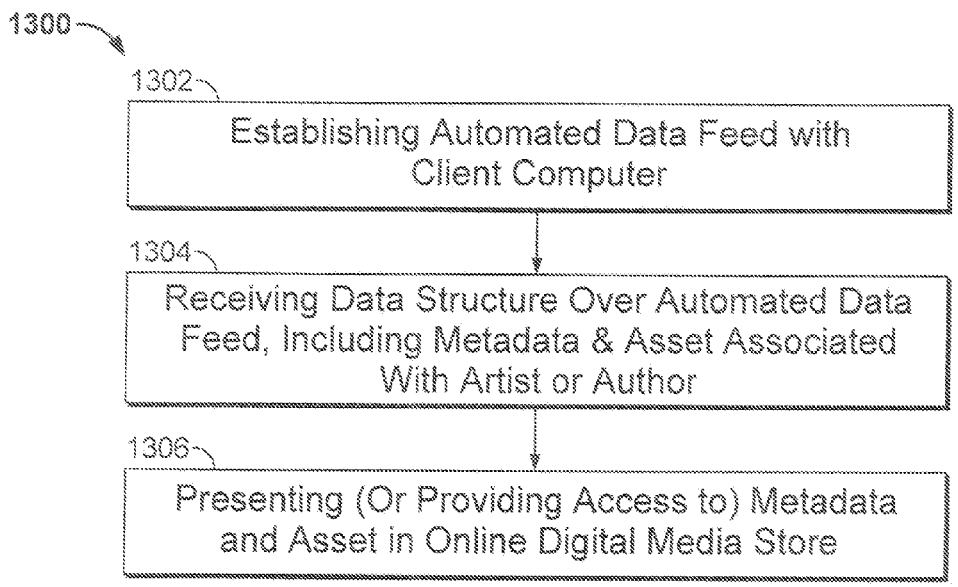
FIG. 13 is a flow diagram of an exemplary process of providing digital media to an online digital media store using an automated data feed.

FIG. 13 is a flow diagram of an exemplary ingestion process 1300 for providing digital media to an online digital media store using an automated data feed. Process 1300 can be implemented by system 100 shown in FIG. 1 using server computers as described in reference to FIG. 15.

In some implementations, process 1300 can begin by establishing an automated data feed with a client computer (1302). The client computer can be operated by or on behalf of a content provider. The data feed can be an XML data feed as described above.

Process 1300 can continue by receiving a unique data structure over the automated data feed (1304). The data structure can be an XML data structure that includes tags for use in parsing metadata and assets from the data structure at the online digital media store.

Process 1300 can continue by presenting (or providing access to) the metadata and assets on the webpage (1306). When the XML data structure is received by, for example, a server computer at the online digital media store, the XML data structure is parsed and the data and assets are indexed and stored in a database. An automated program can retrieve the metadata and asset from the database and use the metadata and asset to populate one or more pages associated with the artist or author.

Exemplary Ingesting Process Using Web Service

Figure 14:
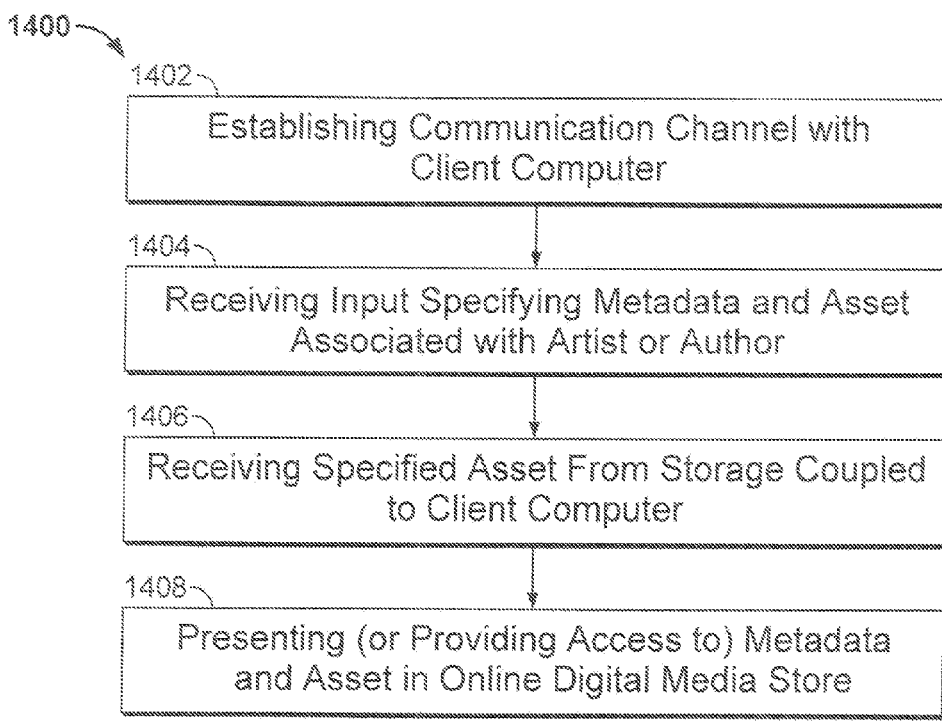
FIG. 14 is a flow diagram of an exemplary process of providing digital media to an online digital media store using a web service.

FIG. 14 is a flow diagram of an exemplary process 1400 of providing digital media to an online digital media store using a web service. Process 1400 can be implemented by system 100 shown in FIG. 1 using server computers as described in reference to FIG. 15.

In some implementations, process 1400 can begin by establishing a communication channel with a client computer (1402). The communication channel can be established through a web services application that provides interactive web pages to a user of a client computer. The client computer can be operated by or on behalf of a content provider.

Process 1400 can continue by receiving input specifying metadata and one or more assets associated with an artist or author (1404). The artist or author has one or more web pages in the online digital media store.

Process 1400 can continue by receiving the specified asset from a storage device coupled to the client computer (1406). The asset can be, for example, a digital photo or an audio or video file. The user can be provided with a browser window that allows the user to navigate a local database of assets and select an asset to be provided to the online digital media store.

Process 1400 can continue by presenting (or providing access to) the metadata and asset(s) on the webpage (1408). When an asset is received by, for example, a server computer of the online digital media store, the asset can be indexed and stored in a database. An automated program can retrieve the metadata and asset from the database and use the metadata and asset to populate one or more pages associated with the artist or author.

Exemplary Server Computer Architecture

Figure 15:
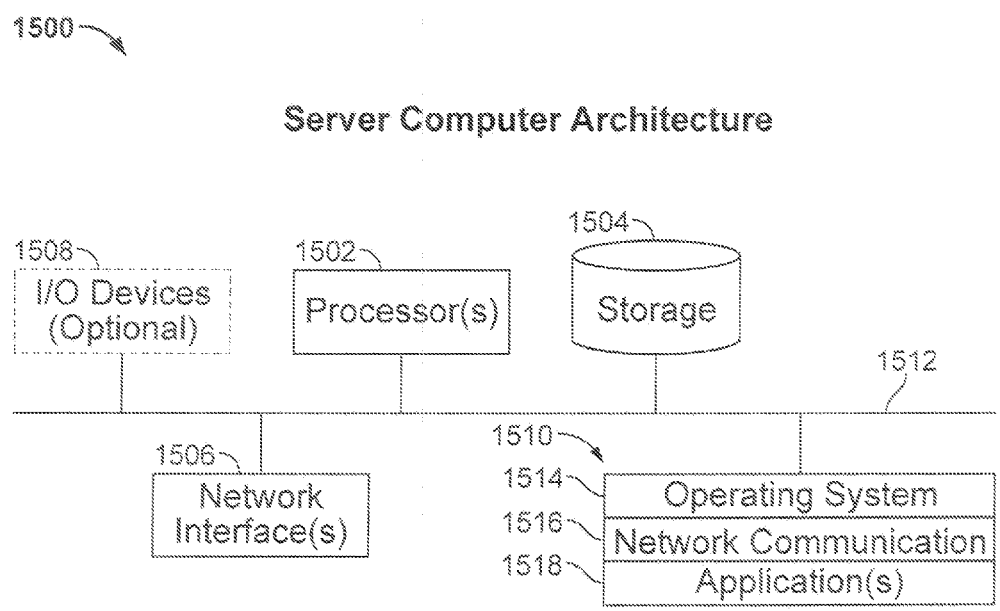
FIG. 15 is a block diagram of exemplary server computer architecture for implementing the features and processes described in reference to FIGS. 1-14.

FIG. 15 is a block diagram of exemplary server computer architecture for implementing the features and processes described in reference to FIGS. 1-14.

The architecture 1500 can be implemented on any data processing apparatus that runs software applications derived from instructions, including without limitation personal computers or mainframe computers. In some implementations, the architecture 1500 can include processor(s) 1502, storage device(s) 1504, network interfaces 1506, Input/Output (I/O) devices 1508 and computer-readable medium 1510 (e.g., memory). Each of these components can be coupled by one or more communication channels 1512.

Communication channels 1512 can be any known internal or external bus technology, including but not limited to ISA, EISA, PCI, PCI Express, NuBus, USB, Serial ATA or FireWire. Storage device(s) 1504 can be any medium that participates in providing instructions to processor(s) 1502 for execution, including without limitation, non-volatile storage media (e.g., optical disks, magnetic disks, flash drives, etc.) or volatile media (e.g., SDRAM, ROM, etc.).

Computer-readable medium 1510 can include various instructions 1514 for implementing an operating system (e.g., Mac OS®, Windows®, Linux). The operating system can be multi-user, multiprocessing, multitasking, multithreading, real-time and the like. The operating system performs basic tasks, including but not limited to: keeping track of files and directories on storage devices(s) 1504; controlling peripheral devices, which can be controlled directly or through an I/O controller; and managing traffic on communication channels 1512. Network communications instructions 1516 can establish and maintain network connections with client devices (e.g., software for implementing communication protocols, such as TCP/IP, HTTP, Ethernet, etc.).

Computer-readable medium 1510 can store instructions, which, when executed by processor(s) 1502 implement one or more applications 1518. For server computers operated by online digital media provider 104 (FIG. 1), applications 1518 can include instructions for implementing a data parser (e.g., XML parser), instructions for verifying the data structure of the data feed, instructions for storing and indexing the parsed data into a database (e.g., database 107) of online digital media store 104. Applications 1518 can also include instructions for generating the pages of online digital medial store 104 and for populating those pages with data from database 107.

For server computers (103a, 103b) operated by content providers (102a, 102b), applications 1518 can include instructions (e.g., UNIX scripts) for creating XML documents, instructions for establishing an automated feed with online digital media store 104 and instructions for a browser application for processing HTML documents and displaying webpages provided by a web service application hosted by online digital media store 104.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). For example, the data access daemon can be accessed by another application (e.g., a notes application) using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of providing digital media to an online digital media store, the method comprising:
   receiving a request from a user to manage an artist or an author;
   determining whether the artist or author is assigned to another user;
   responsive to determining that the artist or author is not assigned to another user, determining whether content associated with the artist or the author had been previously provided to the online digital media store by the user;
   responsive to determining that content associated with the artist or the author had been previously provided to the online digital media store by the user, accepting the request;
   subsequent to accepting the request, establishing an automated data feed between the online digital media store and a first client computer associated with the user;
   receiving, at the online digital media store, a data structure from the first client computer over the automated data feed, the data structure including a first metadata or asset associated with a first digital media file, the first digital media item associated with the artist or author;
   presenting the first digital media file in the online digital media store based on the data structure, wherein presenting the first digital media file in the online digital media store comprises:
      associating the first metadata or asset with the first digital media file on the online digital media store; and
      generating or updating a portion of computer code based on the first metadata or asset and the first digital media file, wherein the portion of computer code, when executed by a second client computer, causes the second client computer to render a graphical representation of the first digital media file.

2. The method of claim 1, where presenting the first digital media file in the online digital media store, includes adding the first digital media file to the online digital media store according to the metadata.

3. The method of claim 1, where presenting the first digital media file in the online digital media store includes replacing, on the online digital media store, a second metadata or asset associated with a second digital media file previously presented in the online digital media store with the first metadata or asset associated with the first digital media file.

4. The method of claim 1, where the data structure includes metadata and assets for multiple digital media files, and the first metadata specifies an order for displaying or presenting the multiple digital media files in the online digital media store.

5. The method of claim 4, where the multiple digital media files are digital images and the metadata specifies an order for displaying the digital images in a gallery of images presented in the online digital media store.

6. The method of claim 1, where the data structure is an Extensible Markup Language (XML) data structure.

7. The method of claim 6, where data structure includes XML tags for metadata or assets associated with a gallery of content to be presented in the online digital media store.

8. The method of claim 7, where the metadata specifies localizations for a display name for the gallery.

9. The method of claim 1, where the assets are audio or video files and the online digital media store presents a playlist that is configure to play at least a portion of the audio or video files on a device coupled to the online digital media store through a network connection.

10. The method of claim 1, where the metadata includes at least one of an artist identifier and a vendor identifier.

11. The method of claim 1, wherein presenting the first digital media file in the online digital media store further comprises:
  indexing and storing the first metadata or asset in a database; and
  retrieving the metadata or asset from the database to populate one or more pages associated with the artist or author.

12. The method of claim 1, wherein generating or updating the page based on the first metadata or asset and the first digital media file comprises updating a preexisting page based on the first metadata or asset.

13. The method of claim 1, wherein generating or updating the page based on the first metadata or asset and the first digital media file comprises creating a new page based on the first metadata or asset.

14. The method of claim 1, further comprising:
  responsive to determining that the artist or author is assigned to another user, rejecting the request.

15. The method of claim 1, further comprising:
  receiving a second request from a second user to manage a second artist or a second author;
  determining whether the second artist or second author is assigned to another user;
  responsive to determining that the second artist or second author is not assigned to another user, determining whether content associated with the second artist or the second author had been previously provided to the online digital media store by the second user;
responsive to determining that content associated with the second artist or the second author had not been previously provided to the online digital media store by the user, determining whether one content item was provided by the second user to the online digital media store with respect to the second artist or the second author within the past x months, where x is positive integer greater than one; and
  responsive to determining that one content item was provided by the second user to the online digital media store with respect to the second artist or the second author within the past x months, accepting the second request.

16. The method of claim 1, further comprising:
  receiving a second request from a second user to manage a second artist or a second author;
  determining whether the second artist or second author is assigned to another user;
responsive to determining that the second artist or second author is not assigned to another user, determining whether content associated with the second artist or the second author had been previously provided to the online digital media store by the second user;
  responsive to determining that content associated with the second artist or the second author had not been previously provided to the online digital media store by the user, determining whether one content item was provided by the second user to the online digital media store with respect to the second artist or the second author within the past x months, where x is positive integer greater than one;
  responsive to determining that one content item was not provided by the second user to the online digital media store with respect to the second artist or the second author within the past x months, determining whether the second user provided the last content item to the online digital media store with respect to the second artist or the second author; and
  responsive to determining that the user provided the last content item to the online digital media store with respect to the second artist or the second author, accepting the request.

17. The method of claim 1, further comprising:
  receiving a second request from a second user to manage a second artist or a second author;
  determining whether the second artist or second author is assigned to another user;
responsive to determining that the second artist or second author is not assigned to another user, determining whether content associated with the second artist or the second author had been previously provided to the online digital media store by the second user;
  responsive to determining that content associated with the second artist or the second author had not been previously provided to the online digital media store by the user, determining whether one content item was provided by the second user to the online digital media store with respect to the second artist or the second author within the past x months, where x is positive integer greater than one;
  responsive to determining that one content item was not provided by the second user to the online digital media store with respect to the second artist or the second author within the past x months, determining whether the second user provided the last content item to the online digital media store with respect to the second artist or the second author; and
  responsive to determining that the user did not provide the last content item to the online digital media store with respect to the second artist or the second author, rejecting the request.

18. A method of providing digital media to an online digital media store, the method comprising:
  receiving a request from a user to manage an artist or an author having digital media that is accessible through the online digital media store;
  determining whether the artist or author is assigned to another user;
  responsive to determining that the artist or author is not assigned to another user, determining whether content associated with the artist or the author had been previously provided to the online digital media store by the user;
  responsive to determining that content associated with the artist or the author had been previously provided to the online digital media store by the user, accepting the request;
  subsequent to accepting the request, establishing a communication channel between the online digital media store and a first client computer associated with the user;

receiving, at the online digital media store, input from the client computer through the communication channel, the input specifying an asset associated with the artist or author;

receiving the specified asset from the client computer;

presenting, or providing access to, the asset in the online digital media store based on the input, wherein presenting or providing access to the asset in the online digital media store comprises:

associating the asset with the artist or author on the online digital media store; and generating or updating a portion of computer code based on the asset, the page presenting the asset, wherein the portion of computer code, when executed by a second client computer, causes the second client computer to render a graphical representation of the asset.

19. The method of claim 18, where the communication channel is established through a web services application.

20. The method of claim 18, where the input includes metadata for creating a gallery of assets, including the received asset.

21. The method of claim 20, where the input specifies an order for displaying the assets in the gallery.

22. A system for providing digital media to an online digital media store, the system comprising:

one or more processors;

memory coupled to the one or more processors and configured for storing instructions, which, when executed by the one or more processors, causes the one or more processors to perform operations comprising:

receiving a request from a user to manage an artist or an author;

determining whether the artist or author is assigned to another user;

responsive to determining that the artist or author is not assigned to another user, determining whether content associated with the artist or the author had been previously provided to the online digital media store by the user;

responsive to determining that content associated with the artist or the author had been previously provided to the online digital media store by the user, accepting the request;

subsequent to accepting the request, establishing an automated data feed between the online digital media store and a first client computer associated with the user;

receiving, at the online digital media store, a data structure from the first client computer over the automated data feed, the data structure including a first metadata or asset associated with a first digital media file, the first digital media file associated with the artist or author;

presenting the first digital media file in the online digital media store based on the data structure, wherein presenting the first digital media file in the online digital media store comprises:

associating the first metadata or asset with the first digital media file on the online digital media store; and generating or updating a portion of computer code based on the first metadata or asset and the first digital media file, wherein the portion of computer code, when executed by a second client computer, causes the second client computer to render a graphical representation of the first digital media file.

23. The system of claim 22, where presenting the first digital media file in the online digital media store, includes adding the first digital media file to the online digital media store according to the metadata.

24. The system of claim 22, where presenting the first digital media file in the online digital media store includes replacing, on the online digital media store, a second metadata or asset associated with a second digital media file previously presented in the online digital media store with the first metadata or asset associated with the first digital media file.

25. The system of claim 22, where the data structure includes metadata and assets for multiple digital media files, and the first metadata specifies an order for displaying or presenting the multiple digital media files in the online digital media store.

26. The system of claim 25, where the multiple digital media files are digital images and the metadata specifies an order for displaying the digital images in a gallery of images presented in the online digital media store.

27. The system of claim 22, where the data structure is an Extensible Markup Language (XML) data structure.

28. The system of claim 27, where data structure includes XML tags for metadata or assets associated with a gallery of content to be presented in the online digital media store.

29. The system of claim 28, where the metadata specifies localizations for a display name for the gallery.

30. The system of claim 22, where the assets are audio or video files and the online digital media store presents a playlist that is configure to play at least a portion of the audio or video files on a device coupled to the online digital media store through a network connection.

31. The system of claim 22, where the metadata includes at least one of an artist identifier and a vendor identifier.

32. A system for providing digital media to an online digital media store, the system comprising:

one or more processors;

memory coupled to the one or more processors and configured for storing instructions, which, when executed by the one or more processors, causes the one or more processors to perform operations comprising:

receiving a request from a user to manage an artist or an author having digital media that is accessible through the online digital media store;

determining whether the artist or author is assigned to another user;

responsive to determining that the artist or author is not assigned to another user, determining whether content associated with the artist or the author had been previously provided to the online digital media store by the user;

responsive to determining that content associated with the artist or the author had been previously provided to the online digital media store by the user, accepting the request;

subsequent to accepting the request, establishing a communication channel between the online digital media store and a first client computer associated with the user;

receiving, at the online digital media store, input from the client computer through the communication channel, the input specifying an asset associated with the artist or author;

receiving, at the online digital media store, the specified asset from the client computer;

presenting, or providing access to, the asset in the online digital media store based on the input, wherein presenting, or providing access to, the asset in the online digital media store comprises:

associating the asset with the artist or author on the online digital media store; and generating or updating a portion of computer code based on the asset, the page presenting the asset, wherein the portion of computer code, when executed by a second client computer, causes the second client computer to render a graphical representation of the asset.

33. The system of claim 32, where the communication channel is established through a web services application.

34. The system of claim 32, where the input includes metadata for creating a gallery of assets, including the received asset.

35. The system of claim 34, where the input specifies an order for displaying the assets in the gallery.

* * * * *